3,020,222
METHOD FOR CASTING SIDE SUPPORTING PLATES ONTO THE EDGES OF SPACED NUCLEAR FUEL PLATES
John L. Zambrow, Westbury, and Seymour I. Megeff, Flushing, N.Y., assignors, by mesne assignments, to Sylvania Electric Products Inc., a corporation of Delaware
Filed Sept. 28, 1959, Ser. No. 842,639
19 Claims. (Cl. 204—154.2)

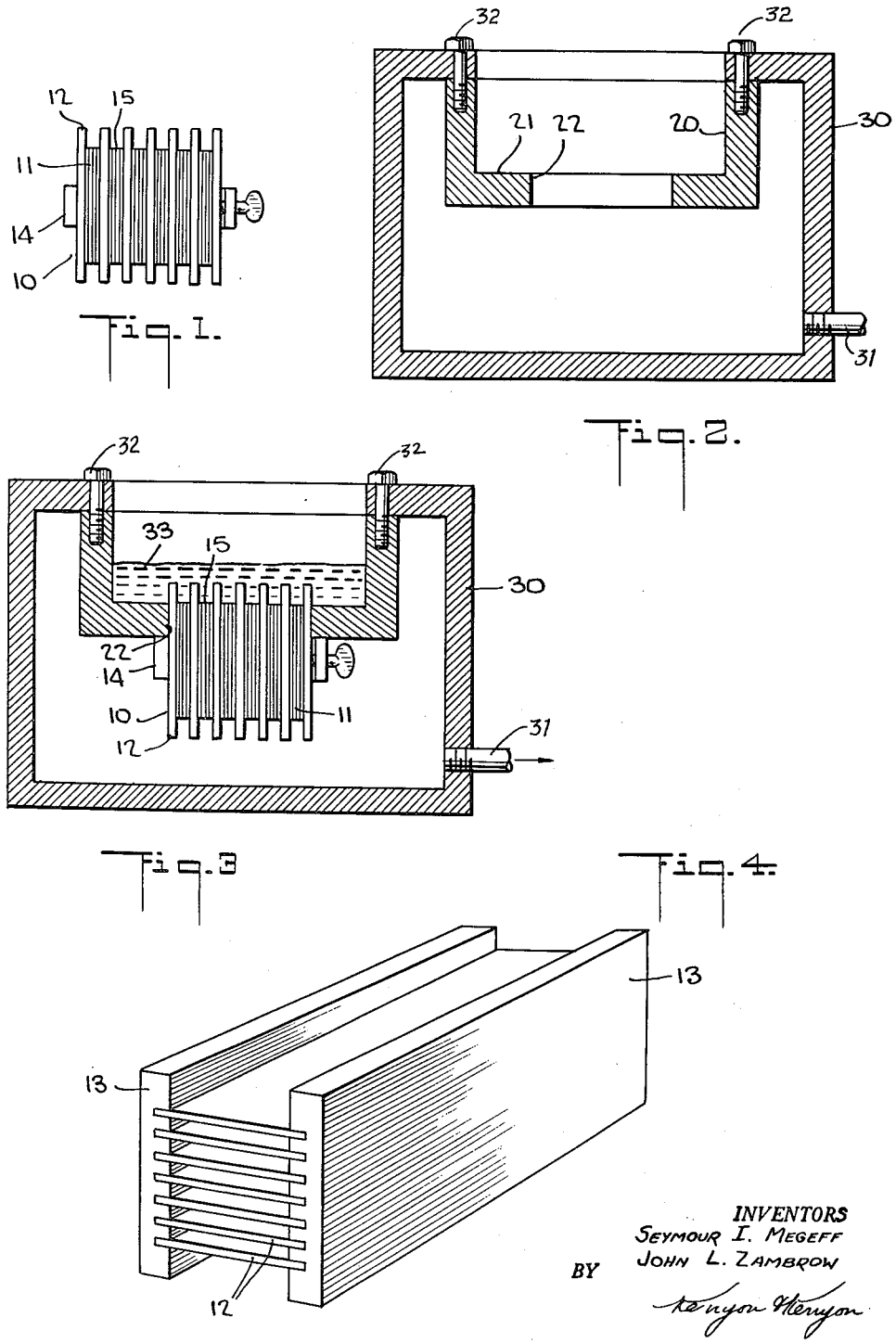

This invention relates to nuclear fuel plate assemblies and methods for their assembly, and more particularly to a method for casting side plates onto spaced parallel nuclear fuel plates and the like to assemble them for use.

The fuel elements in nuclear power devices commonly comprise spaced parallel plates between which cooling water flows, said plates usually having a uranium alloy fuel core and aluminum protective cladding.

The uranium alloy is quite expensive, and the cladding of uranium alloy plates with aluminum is a tedious and expensive process. Consequently the assembled plates are costly to replace if damaged.

The cladding is necessary, since the uranium alloy would erode as it atomically disintegrates if it were exposed instead of being clad. Aluminum has been utilized as a cladding material because it has good thermal conductivity and low atomic cross section.

When fuel plates are brazed to side plates, a high percentage of rejects occurs due to warpage, voids in the brazed joint and other defects. A number of alternatives to brazing exist. The majority of these alternatives have employed variations of a mechanical joint between the plates and the end plate, sometimes with metallurgical bonding also present. The chief factor that remains undesirable in all the mechanical joint solutions has been cost of production.

The instant invention presents a method that avoids the relatively costly and involved machining operations that all such mechanical joints entail.

It is therefore an object of the invention to provide a relatively simple and inexpensive method for affixing side plates onto the edges of spaced parallel plates.

Another object of the invention is the provision of a method utilizing a simple inexpensive apparatus for effecting said fabrication.

A further object of the invention is the provision of a method that effects a metallurgical and mechanical bond between the side plates and the fuel plates.

A still further object of the invention is the provision of a method that avoids blowholes and voids in cast side plates while attaining an intimate and complete bond of side plates to fuel plates.

Briefly stated the invention is directed to a method of assembling a plurality of fuel plates in a nuclear reactor fuel assembly comprising the steps of deforming the side edges of the plates, and stacking them in spaced overlying relation to one another with porous, loosely held graphite spacing members between adjacent plates and with the deformed respective side edges of the plates aligned relative to one another.

The stack of plates is then temporarily clamped together as a group. The spacers therebetween are set back from the edges of the stacked plates a certain uniform distance from at least one side thereof, that side being the one on which said side plates will be cast.

A vacuum chamber is then provided, one face of which accommodates a graphite mold. The clamped stack of plates is then lowered into an opening in the vacuum chamber graphite mold until the edge of said spacers set back from the fuel plates edges are coplanar with said graphite mold surface, the plate edges to be cast onto sticking up from said coplanar surface, and the said stack of plates is secured and sealed therein.

The entire assembly is then placed in a furnace and heated to about 550° C., the chamber is evacuated, and superheated molten aluminum at about 850° C. is poured into said mold until it covers said plate edges sticking up therefrom to a desired depth.

Upon cooling, a cast side plate is produced. Reversal of the stacked plates will then allow casting of an opposed side plate.

A feature of the invention thus resides in the drawing down of the molten aluminum into intimate contact with the protruding fuel plate edges and the attendant evacuation of entrapped gases through the porous graphite.

Further objects and a fuller understanding of the invention may be had by referring to the following description and claims taken in conjunction with the accompanying drawings in which:

FIGURE 1 is a side view of the stacked plates ready for insertion into the mold;

FIGURE 2 is an elevational cross-section of one apparatus adapted to employ the method of the invention comprising a mold and vacuum chamber;

FIGURE 3 is an elevational cross-section of the apparatus of FIGURE 2 with the stacked plates of FIGURE 1 positioned therein, and after the molten aluminum has been poured; and FIGURE 4 is a perspective view of the finished fuel plate and side plate assembly after casting of both side plates and removal from the mold.

Referring to the drawings, the steps of the invention employ in general a fuel plate and spacer assembly 10, a mold 20, and a housing or vacuum chamber means 30.

As illustrated in FIGURE 1, fuel plate and spacer assembly 10 comprises a plurality of spacers 11 and a plurality of fuel plates 12. All the spacers are generally of the same thickness and major dimensions, though they may vary if desired. The spacers are preferably constructed of graphite, or a similar heat-resistant, porous, lubricating material, and are relatively loosely held between the fuel plates by clamping means 14.

The major dimension of said spacers parallel to the fuel plate edges to be embedded in side plates is equal to the major dimension of said fuel plates taken along those edges. The other major dimension of said spacers, that is the one perpendicular to said embedding fuel plate edges, may be any dimension adequate to assure full spacing support of said fuel plates along that dimension. Said spacers are placed inwardly from and parallel to said embedding edges of said fuel plates a distance equal to the desired insertion of said fuel plates into the side plates. The fuel plate side edges may be scored or perforated by boring, undercutting, or similar surface deformations (not shown).

As illustrated in FIGURES 2 and 3, chamber means 30 comprises any vacuum chamber having a proper opening as hereafter described, an exhaust port 31, and a proper sealing surface for sealing said opening to the mold 20 as also hereafter described.

As further illustrated, mold 20 comprises a rectangular mold preferably fabricated of graphite or other suitable refractory matrial. Said mold has a rectangularly depressed portion 21 having the dimensions desired in the final cast side plate. Centrally located in said depressed portion is an opening 22 the size and shape of said stacked plate assembly and disposed to accommodate said assembly in sufficiently tight registration for the purposes of the invention. Mold 20 may be fabricated in one part, or may be split so as to present two identical halves sectioned across said centrally located opening. Mold 20 is disposed to close the said opening in chamber means 30 and to sealably cooperate with said opening. Passage or exhaust port 31 is provided in chamber means 30 through which the housing may be evacuated with the mold 20 and plate and spacer assembly 10 in place.

The steps of the invention comprises the following: The fuel plates 12 are scored at the edges to be cast as above described, and then assembled with spacers 11 in spaced overlying relation into a fuel plate and spacer assembly or stack 10 as illustrated in FIGURE 1. The whole assembly is held together by clamp 14.

The clamped stacked assembly 10 is then fitted into said opening 22 in mold 20. Mold 20 is mounted into chamber means or housing 30 and sealed thereinto by suitable means such as bolts 32. Stacked assembly 10 is adjusted in said mold 20 until the bottom of said mold 20 is coplanar with each of the edges 15 of said spacers 11 at the edges of said plates 12 on which the side supporting member is to be cast. This step is illustrated in FIGURE 3, and it is noted that the mold bottom and spacer edges form in effect a common bottom out of which the plate edges protrude.

The entire assembly is then soak heated in a furnace or the like at about 550° C. until it attains that temperature, while a roughing pump or other suitable device evacuates said vacuum chamber.

Molten aluminum 33, e.g. type 2S or 6061, preferably superheated to about 850° C., is then poured into the mold until a desired depth is deposited. Superheated aluminum is employed to increase average fluidity during the process and to supply enough heat to keep the aluminum liquid throughout the duration of the casting operation.

During the latter step, the external heat may be removed, and the vacuum in said chamber will insure the drawing of the molten aluminum into intimate contact with said plates, owing possibly in part to the porosity of the graphite spacers and perhaps primarily to their loose orientation relative to said plates.

Blow holes and dry spots are thus avoided because the aluminum is forced into intimate contact by the pressure from above, and the gases trapped at the plate surfaces are sucked down through the stack and away by the vacuum below.

The vacuum of course cooperates with the atmospheric pressure above the molten aluminum to produce this effect, but it is understood that positive pressure at that surface such as by gas, or centrifugal action, or by a die, might also be employed to achieve equivalent results.

When the casting has cooled, the assembly is reversed and a side supporting plate is cast on the opposing fuel plate edges. The plate assembly with both side plates 13 cast thereon is illustrated upon removal from the mold by FIGURE 4.

A finish machining step brings the cast side plates to the proper dimensions, although if care is exercised in the mold dimensions, this step may be omitted.

The method of the invention thus avoids tedious precision machining such as is required in making elaborate mechanical locking joints, and additionally provides a metallurgical bond as well as mechanical. The method is therefore much more economical than the conventional methods of affixing side plates, and additionally calls into play fewer precision operations. Additionally the method entirely avoids the impediments to nuclear emission often encountered in brazed joints, especially voids and blowholes.

Although the invention has been described with a certain degree of particularity, it is understood that the present disclosure has been made only by way of example, and that numerous changes in the details of construction and operation might occur to those skilled in the art. For example, the casting mold may be constructed of four quadrants or sections, so that it could be adjusted in two dimensions for accommodating slight differences in dimensions of the stack assembly, suitable gasket means such as asbestos or the like being utilized along mating edges of the quadrants to provide a leak-proof molding cavity. The quadrants would then be clamped in both horizontal directions.

These and other changes or additions might be made without departing from the scope and spirit of the invention.

We claim:

1. A method of fabricating a side supporting member along corresponding edge portions of a plurality of spaced nuclear fuel plates comprising the steps of forming a porous molding cavity wherein said edge portions project into said cavity through one surface thereof to a preselected degree, introducing molten material into said cavity to cover said edges, and applying a differential pressure across said surface while said molten material hardens to insure intimate contact of said material with said edge portions along their lengths, said differential pressure including a vacuum applied beneath said porous molding cavity.

2. A method of fabricating a side supporting member along corresponding edge portions of a plurality of spaced nuclear fuel plates comprising the steps of forming a porous molding cavity wherein said edge portions project into said cavity through the bottom thereof to a preselected degree, introducing molten material into said cavity to a desired depth covering said edge portions, and applying a differential pressure across said bottom to insure intimate contact of said material with said edge portions, said differential pressure including a vacuum applied beneath said porous molding cavity.

3. A method of fabricating a side supporting member along corresponding edge portions of a plurality of spaced nuclear fuel plates comprising the steps of forming a porous horizontal molding cavity wherein said edge portions project into said cavity through the bottom thereof to a preselected degree, introducing molten material into said cavity to a desired depth covering said edge portions, and applying a differential pressure across said bottom to insure intimate contact of said material with said edge portions, said differential pressure including a vacuum applied beneath said porous molding cavity.

4. A method of fabricating a side supporting member along corresponding edge portions of a plurality of spaced nuclear fuel plates comprising the steps of forming a porous horizontal molding cavity wherein said edge portions project into said cavity through the bottom thereof to a preselected degree and at spaced positions relative to one another, introducing molten material into said cavity to a desired depth covering said edge portions, and applying a differential pressure across said bottom to insure intimate contact of said material with said edge portions, said differential pressure including a vacuum applied beneath said porous molding cavity.

5. A method of fabricating a side supporting member along corresponding edge portions of a plurality of spaced nuclear fuel plates comprising the steps of forming a porous horizontal molding cavity wherein said edge portions project into said cavity through the bottom thereof to a preselected degree and at spaced positions relative to one another, introducing molten material into said cavity to a desired depth covering said edge portions, and applying a differential pressure across said bottom to insure intimate contact of said material with said edge portions, the fit of said edge portions in said bottom being loose enough to permit leakage of said molten material down said edge portions for a limited distance, said differential pressure including a vacuum applied beneath said porous molding cavity.

6. A method of assembling a plurality of overlying nuclear fuel plates onto a side-supporting member comprising the steps of stacking said plates in a spaced overlying relation to one another so as to prevent spaced overlying casting edges, providing a molding cavity having an inner porous surface, said plate casting edges extending through said surface into said cavity, introducing molten aluminum into said mold covering the portions of said plate edges extending thereinto, providing differential pressures between the surface of said molten aluminum and the inner porous surface of said mold cavity, said molten aluminum surface having the higher of the differential pressures, said differential pressure including a vacuum applied beneath said porous molding cavity, and allowing said molten aluminum to cool and harden to provide a side-supporting member for said edges.

7. A method of assembling a plurality of overlying nuclear fuel plates onto a side-supporting member comprising the steps of stacking said plates in a spaced overlying relation to one another so as to present spaced overlying casting edges, providing means adapted to define a relatively porous mold cavity having an inner porous surface, said surface being breached by said plate casting edges extending therethrough into said cavity in close registration therewith, providing a vacuum beneath said inner porous surface, casting molten aluminum into said mold covering the portion of said plate edges extending thereinto, and allowing said molten aluminum to cool and harden to provide a side-supporting member for said edges.

8. A method of assembling a plurality of fuel plates into a nuclear fuel assembly comprising the steps of stacking said plates in a spaced overlying relation to one another with relatively porous spacing members between adjacent plates with the respective side edges of said plates aligned relative to one another and said spacers set back from said plate side edges, providing horizontal mold means adapted to utilize said spacer edges as part of the bottom thereof thereby presenting a relatively porous mold cavity with said plate side edges projecting upwardly thereinto, introducing molten aluminum into said mold cavity until said plate edges projecting thereinto are completely immersed, providing differential pressure between the surface of said molten aluminum and the inner porous surface of said mold cavity, said molten aluminum surface having the highest of said differential pressures, said differential pressure including a vacuum applied beneath said porous molding cavity, and allowing said molten aluminum to cool and harden to provide a side-supporting member for said edges.

9. A method of assembling a plurality of fuel plates into a nuclear fuel assembly comprising the steps of stacking said plates in a spaced overlying relation to one another with spacing members between adjacent plates and with the respective side edges of said plates aligned relative to one another and said spacers set back from said plate side edges, providing horizontal mold means utilizing said spacer edges as part of the bottom thereof with said plate side edges projecting upwardly thereinto, introducing molten aluminum into said mold cavity until said plate edges projecting thereinto are completely immersed, providing a vacuum beneath said projecting plate side edges and allowing said molten aluminum to cool and harden to provide a side supporting member for said edges.

10. A method of assembling a plurality of fuel plates into a nuclear fuel assembly comprising the steps of stacking said plates in a spaced overlying relation to one another with relatively porous mold material spacing members between adjacent plates, with the respective side edges of said plates aligned relative to one another and said spacers set back from said plate side edges, providing horizontal mold means utilizing said spacer edges as part of the bottom thereof with said plate side edges projecting upwardly thereinto, heating said assembly to approximately 550° C. while sustaining a vacuum beneath said projecting plate side edges, introducing molten aluminum into said mold cavity until said plate edges projecting thereinto are completely immersed, and allowing said molten aluminum to cool and harden to provide a side supporting member for said edges.

11. A method of assembling a plurality of fuel plates into a nuclear fuel assembly comprising the steps of stacking said plates in a spaced overlying relation to one another with relatively porous mold material spacing members between adjacent plates with the respective side edges of said plates aligned relative to one another and said spacers set back from said edges, providing horizontal mold means having a horizontal mold surface with said plate edges projecting upwardly therefrom, sustaining a vacuum around said stacked plates below said horizontal mold surface, heating said entire assembly to approximately 550° C., pouring superheated molten aluminum into said mold means until said upwardly projecting plate edges are covered, allowing said molten aluminum to cool and harden to provide a side supporting member for said edges, and repeating said operations to provide a side supporting member for the opposed set of side edges.

12. A method of assembling a plurality of fuel plates in a nuclear reactor fuel assembly comprising the steps of arranging said plates in a desired spaced orientation and temporarily interconnecting said plates as a group with edges of respective selected edges aligned relative to one another, molding a side supporting member in situ along each group of aligned side edges and thereafter removing the temporary interconnection between said plates.

13. A method of assembling a plurality of overlying plates onto a side-supporting member comprising the steps of stacking said plates in a spaced overlying relation to one another so as to present spaced overlying casting edges, providing means adapted to define a relatively porous mold cavity having a horizontal porous inner surface, said surface being breached by said plate casting edges extending vertically upward therethrough in close registration and into said cavity, casting molten aluminum into said mold covering the portion of said plate edges extending thereinto, providing differential pressure between the surface of said molten aluminum and the inner porous surface of said mold cavity, said molten aluminum surface having the higher of said differential pressures, said differential pressures including a vacuum applied beneath said porous molding cavity, and allowing said molten aluminum to cool and harden to provide a side-supporting member for said edges.

14. A method of assembling a plurality of overlying plates onto a side-supporting member comprising the steps of stacking said plates in a spaced overlying relation to one another so as to present spaced overlying casting edges, providing means adapted to define a relatively porous mold cavity having a horizontal porous inner surface, said surface being breached by said plate casting edges extending vertically upward therethrough in close registration and into said cavity, providing a vacuum beneath said inner porous surface, casting molten aluminum into said mold covering the portion of said plate edges extending thereinto and allowing said molten aluminum to cool and harden to provide a side-supporting member for said edges.

15. A method of assembling a plurality of fuel plates into a nuclear fuel assembly comprising the steps of stacking said plates in a spaced overlying relation to one another with relatively porous mold material spacing members between adjacent plates with the respective side edges of said plates aligned relative to one another and said spacers set back from said plate side edges, providing horizontal mold means adapted to sealably surround said stacked plates so as to provide a horizontal mold cavity surface coplanar with the edges of said spacers that are set back from said plate edges so as to present a continuous mold surface with said plate edges projecting upwardly therefrom, providing vacuum means adapted to sustain a vacuum around said plates below said continuous mold surface, placing said stacked plates in said position, sustaining said vacuum, introducing molten aluminum into said mold cavity until said plate edges projecting thereinto are completely immersed, and allowing said molten aluminum to cool and harden to provide a side supporting member for said edges.

16. A method of assembling a plurality of fuel plates into a nuclear fuel assembly comprising the steps of deforming the side edges of said plates, stacking said plates in a spaced overlying relation to one another with relatively porous mold material spacing members between adjacent plates with the respective side edges of said plates aligned relative to one another and said spacers set back from said plate side edges, providing horizontal mold means adapted to utilize said spacer edges as part of the bottom thereof thereby presenting a mold cavity surface with said plate side edges projecting upwardly thereinto and vacuum means adapted to sustain a vacuum around said stacked plates below said mold surface, placing said stacked plates in said position, sustaining said vacuum, introducing molten aluminum into said mold cavity until said plate edges projecting thereinto are completely immersed, and allowing said molten aluminum to cool and harden to provide a side supporting member for said edges.

17. A method of assembling a plurality of fuel plates in a nuclear reactor fuel assembly comprising the steps of stacking said plates in a spaced overlying relation to one another, temporarily clamping said plates together as a group, providing an open mold cavity, filling said cavity with a casting material to a desired depth, immersing one set of side edges of said group in said material, maintaining said group in such immersed position while said material hardens to provide a side supporting member for said side edges, and thereafter removing said spacing members.

18. A method of assembling a plurality of fuel plates in a nuclear reactor fuel assembly comprising the steps of deforming the side edges of said plates, stacking said plates in a spaced overlying relation to one another, temporarily clamping said plates together as a group, providing an open mold cavity, filling said cavity with a casting material to a desired depth, immersing one set of side edges of said group in said material, maintaining said group in such immersed position while said material hardens to provide a side supporting member for said side edges, and thereafter removing said spacing members.

19. A method of assembling a plurality of fuel plates in a nuclear reactor fuel assembly comprising the steps of deforming the side edges of said plates, stacking said plates in a spaced overlying relation to one another and with the deformed respective side edges of said plates aligned relative to one another, temporarily clamping said plates together as a group, providing a flat, generally rectangular mold cavity, filling said cavity with a casting material to a desired depth, immersing one set of side edges of said group in said material, maintaining said group in said immersed position while said material hardens to provide a side supporting member for said side edges, removing said spacing members, and thereafter repeating the casting operation to provide a side supporting member for the opposed set of side edges.

References Cited in the file of this patent

UNITED STATES PATENTS

| | | |
|---|---|---|
| 82,686 | Brown | Oct. 6, 1868 |
| 231,028 | Fleck | Aug. 10, 1880 |
| 700,959 | Lutz | May 27, 1902 |
| 728,189 | Bijur | May 19, 1903 |
| 770,139 | Wood et al. | Sept. 13, 1904 |
| 1,171,818 | Walpole | Feb. 15, 1916 |
| 1,360,484 | Waird | Nov. 30, 1920 |
| 2,285,812 | Gay | June 9, 1942 |
| 2,369,291 | Frank et al. | Feb. 13, 1945 |

OTHER REFERENCES

International Conf. on Peaceful Uses of Atomic Energy, vol. 9, 1955, pages 203–207.

UNITED STATES PATENT OFFICE
CERTIFICATE OF CORRECTION

Patent No. 3,020,222 February 6, 1962

John L. Zambrow et al.

It is hereby certified that error appears in the above numbered patent requiring correction and that the said Letters Patent should read as corrected below.

Column 4, line 74, for "prevent" read -- present --.

Signed and sealed this 12th day of June 1962.

(SEAL)
Attest:

ERNEST W. SWIDER
Attesting Officer

DAVID L. LADD
Commissioner of Patents